(12) United States Patent
Setterberg et al.

(10) Patent No.: US 11,904,738 B2
(45) Date of Patent: Feb. 20, 2024

(54) DRIVE MEMBER

(71) Applicant: Volvo Car Corporation, Gothenburg (SE)

(72) Inventors: Peter Setterberg, Partille (SE); Lars Modh, Uddevalla (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/839,683

(22) Filed: Jun. 14, 2022

(65) Prior Publication Data

US 2022/0402408 A1    Dec. 22, 2022

(30) Foreign Application Priority Data

Jun. 17, 2021    (EP) .................................... 21180118

(51) Int. Cl.
  *B60N 2/23*        (2006.01)
  *B60N 2/02*        (2006.01)

(52) U.S. Cl.
  CPC ........... *B60N 2/23* (2013.01); *B60N 2/02246* (2023.08); *B60N 2/02258* (2023.08)

(58) Field of Classification Search
  CPC ...... B60N 2/23; B60N 2/0232; B60N 2/2245; B60N 2/929; B60N 2/233; B60N 2002/024; B60N 2002/0236; F16H 25/20; F16H 2025/2031; F16H 2025/2081

USPC ..................................................... 297/362.12
  See application file for complete search history.

(56) References Cited

U.S. PATENT DOCUMENTS

2020/0040971 A1    2/2020   Ritter et al.

FOREIGN PATENT DOCUMENTS

| DE | 102008017017 A1 | 12/2008 |
| DE | 102009022518 A1 | 11/2010 |
| DE | 102010003639 A1 | 12/2010 |

OTHER PUBLICATIONS

Nov. 17, 2021 European Search Report issued in Corresponding International Application No. 21180118.

*Primary Examiner* — Mark R Wendell
(74) *Attorney, Agent, or Firm* — Clements Bernard Walker; Christopher L. Bernard

(57) ABSTRACT

A drive member including a motor with a longitudinal axis and with at an actuating end a gear mechanism. A support member carries a displacement rod that is movably mounted on the support member. The motor is with its actuating end connected to the support member. The gear mechanism includes a hinge member allowing pivoting of the displacement rod about a pivot axis that is oriented transversely to the longitudinal axis. The gear mechanism engages with the displacement rod and the support member is hingingly attached to a fixation bracket in a hinge connection that is hingeable about an axis which is oriented transversely to the longitudinal axis. The drive member can be used for the adjustment of the backrest of a rear seat in a motor vehicle.

11 Claims, 4 Drawing Sheets

DRIVE MEMBER

CROSS-REFERENCE TO RELATED APPLICATION

The present disclosure claims the benefit of priority of co-pending European Patent Application No. 21180118.8, filed on Jun. 17, 2021, and entitled "Drive Member," the contents of which are incorporated in full by reference herein.

TECHNICAL FIELD

The present disclosure relates to a drive member including a motor with a longitudinal axis and having at an actuating end a gear mechanism, a support member carrying a displacement rod that is movably mounted on the support member.

The disclosure also relates to a vehicle including a seat with a back rest that is adjustable via such a drive member.

BACKGROUND

Motor vehicles having a pivotable rear seat part that is adjustable by a drive member are known. The drive member has a motor including a reduction gear mechanism at its output shaft. The gear mechanism drives a threaded spindle shaft via a worm wheel situated in the housing of an output conversion mechanism. The spindle shaft extends in the direction of the seat frame, while the motor drive is oriented with its axis transversely to the spindle shaft, in the plane of the backrest.

The known drive mechanism is of a relatively heavy construction in order to take up the forces that act on it. Furthermore, the rigid connection of the drive member to the seat and to the vehicle requires small tolerances and is placed under strain during adjustment of the seat when the angle between the drive member and the seat is changed. Also in case of an accident, the direction of the forces transferred from the back rest to the drive mechanism may lead to deformation of the drive mechanism.

It is an object of the disclosure to provide a drive member that is of reduced weight. It is a further object to provide a drive member and that allows for larger tolerances in the connecting parts and that maintains its functionality during adjustment of the parts. It is again an object to provide a drive member for adjusting a back rest in a vehicle that provides improved safety during a rearward crash.

SUMMARY

A drive member in accordance with the disclosure includes a motor that is connected by its actuating end to the support member, a gear mechanism that includes a hinge member which allows pivoting of the displacement rod about a pivot axis that is oriented transversely to the longitudinal axis, the gear mechanism engaging with the displacement rod, the support member being hingedly attached to a fixation bracket by a hinge connection that is hingeable about an axis which is transverse to the longitudinal axis.

The hinging support of the motor and the displacement rod and the pivoting movement of the displacement rod that is allowed by the gear mechanism, ensure that the rod is properly aligned in the direction of movement and that an efficient push-pull movement is effected. This results in a weight reduction of the drive member, which may be of less than half the weight of the known drive members. Furthermore, the self-alignment of the drive member according to the disclosure allows larger tolerances in the structure, such as a backrest and the frame of a vehicle, that are attached to the drive member. During adjustment of the position of the connected parts, or during a crash in case the drive member is mounted in a vehicle, the drive member according to the disclosure remains aligned with the direction of movement and exerts an efficient push-pull force in the direction of the displacement.

The displacement rod may extend along the motor in the direction of the longitudinal axis to provide a compact drive member.

A drive member may have a fixation bracket that includes a plate-shaped body with a central opening with, at each opposed edge, a flange transverse to the plane of the body, the flanges carrying the support member.

A proper alignment of the displacement rod is obtained by the drive member pivoting in the opening of the fixation bracket, in which opening the gear mechanism is accommodated.

The motor may be situated at a first side of the plate-shaped body, the displacement rod extending via the opening to a second side of the body and being provided at that side with a movable joint.

The motor and the displacement rod extend on respective sides of the fixation bracket, which may be mounted to adjust a backrest of a seat in a vehicle without parts being situated in the plane of the backrest.

In an embodiment, the displacement rod at the side of the motor includes a free end that is not provided with attachment means for proper alignment of the rod with the direction of the push and pull forces.

A vehicle including a seat with a back rest than can pivot about a lower pivot axis may include a drive member according to the disclosure, the fixation bracket being connected to frame part of the vehicle and the displacement rod being attached to an upper part of the back rest. The seat may be a rear seat.

The reduced weight of the drive member results in reduced fuel consumption. The placement of the motor and the displacement rod transversely to the plane of the seat ensures that no components interact with the back support surface. Furthermore, the alignment of the displacement rod with the adjusted seat position results in a smooth operation, and during an impact from the rear, the forces are properly transferred from the backrest to the vehicle frame.

BRIEF DESCRIPTION OF THE DRAWINGS

An embodiment of the drive member will, by way of non-limiting example, be described in detail with reference to the accompanying drawings. In the drawings.

DETAILED DESCRIPTION

Figure 1:
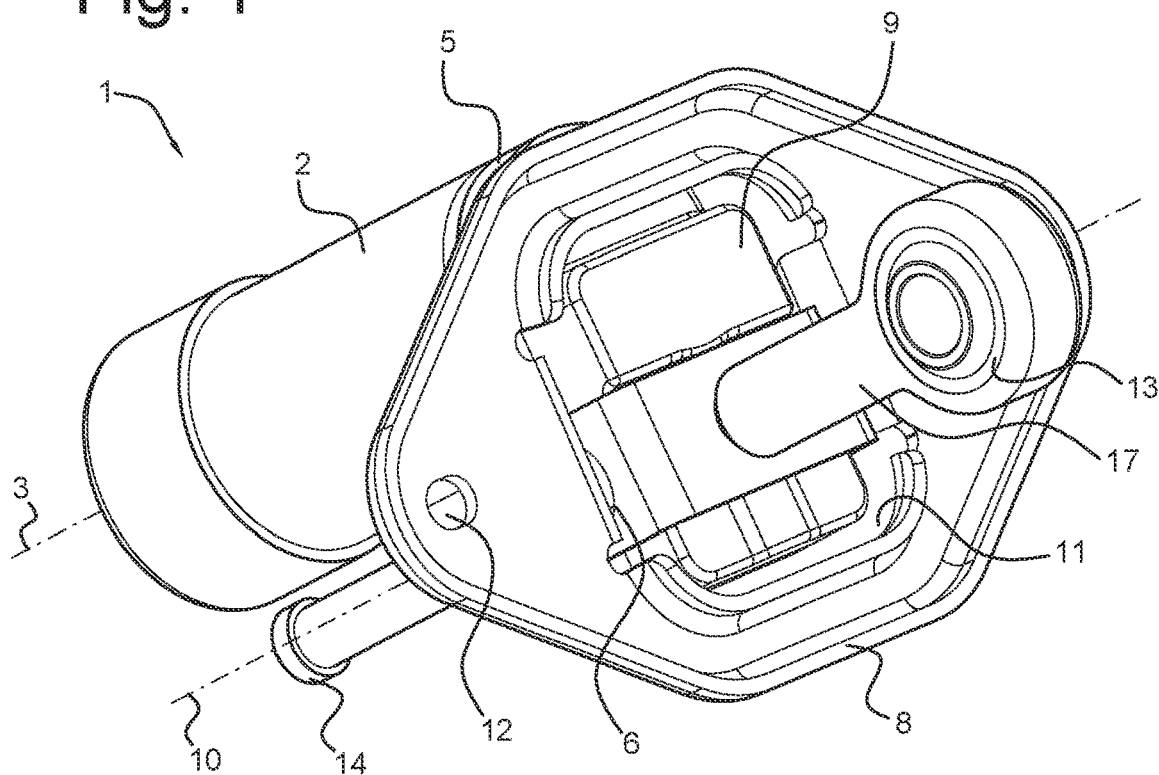
FIG. 1 shows a perspective view of a drive member according to the disclosure.

FIG. 1 shows a drive member 1 according to the present disclosure including a motor 2 with a longitudinal axis 3.

The motor 2 is at its actuating end 5 connected to a support member 6. A gear mechanism is housed in a gearbox 9 and drives a displacement rod 7 that is slidably mounted in the support member 6. The support member 6 is connected to a fixation bracket 8 so that it can pivot about the axis 10 that is oriented transversely to the longitudinal axis 3.

The displacement rod 7 includes on its outer surface a toothed surface that engages with the gear mechanism in the gearbox 9 for displacement of the rod in its length direction. On its attachment end, the rod 7 includes a movable joint 13. At a free end 14 of the rod 7, no connection member is provided.

The fixation bracket 8 includes a plate-shaped body with a central opening 11 through which the displacement rod 7 extends. Two side parts 12,12' of the bracket 8 are provided for connection, for instance to a frame part of a vehicle.

Figure 2:
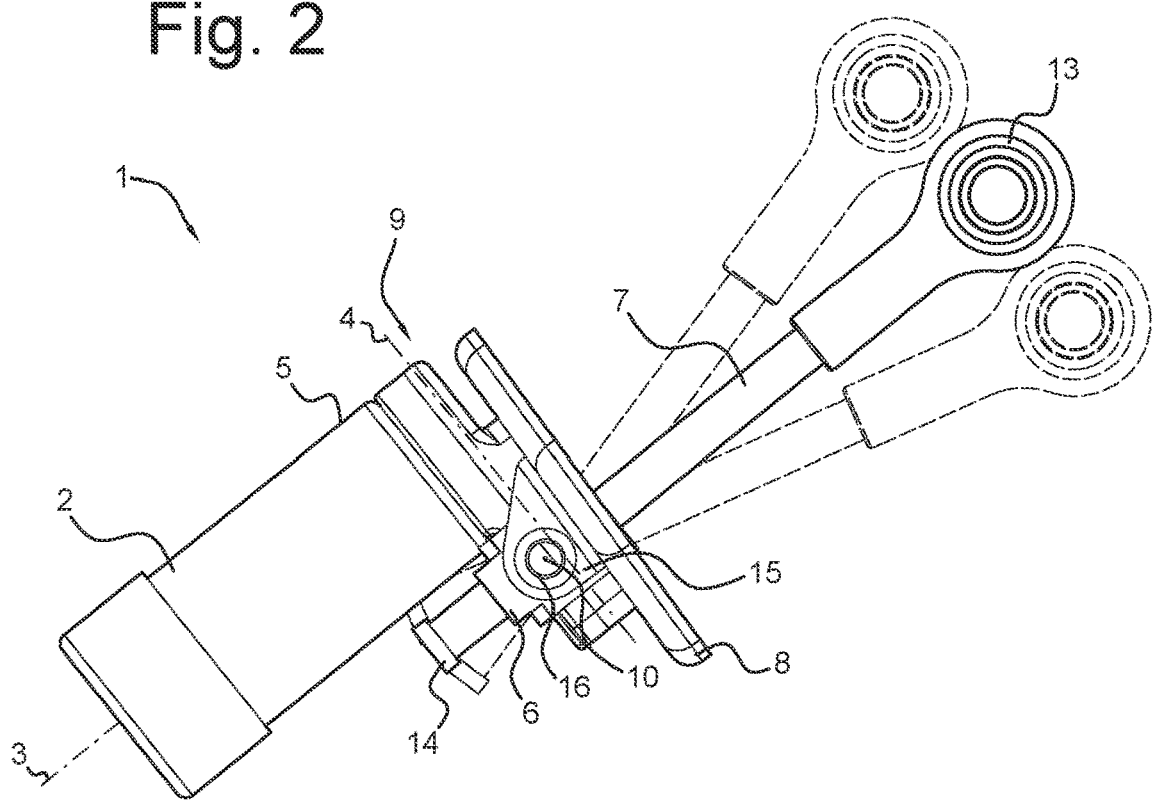
FIG. 2 shows a side view of the drive member of FIG. 1, for different positions of the displacement rod.

FIG. 2 shows a side view of the drive member 1, in which the flanges 15 of the bracket 8 are visible, that carry the motor 2 in a hinging manner via a stub 16 on support member 6 that carries the gearbox 9. By hinging in the brackets 8, the displacement rod can assume the positions indicated by the dotted lines. The displacement rod can pivot about the pivot axis 4.

Figure 3:
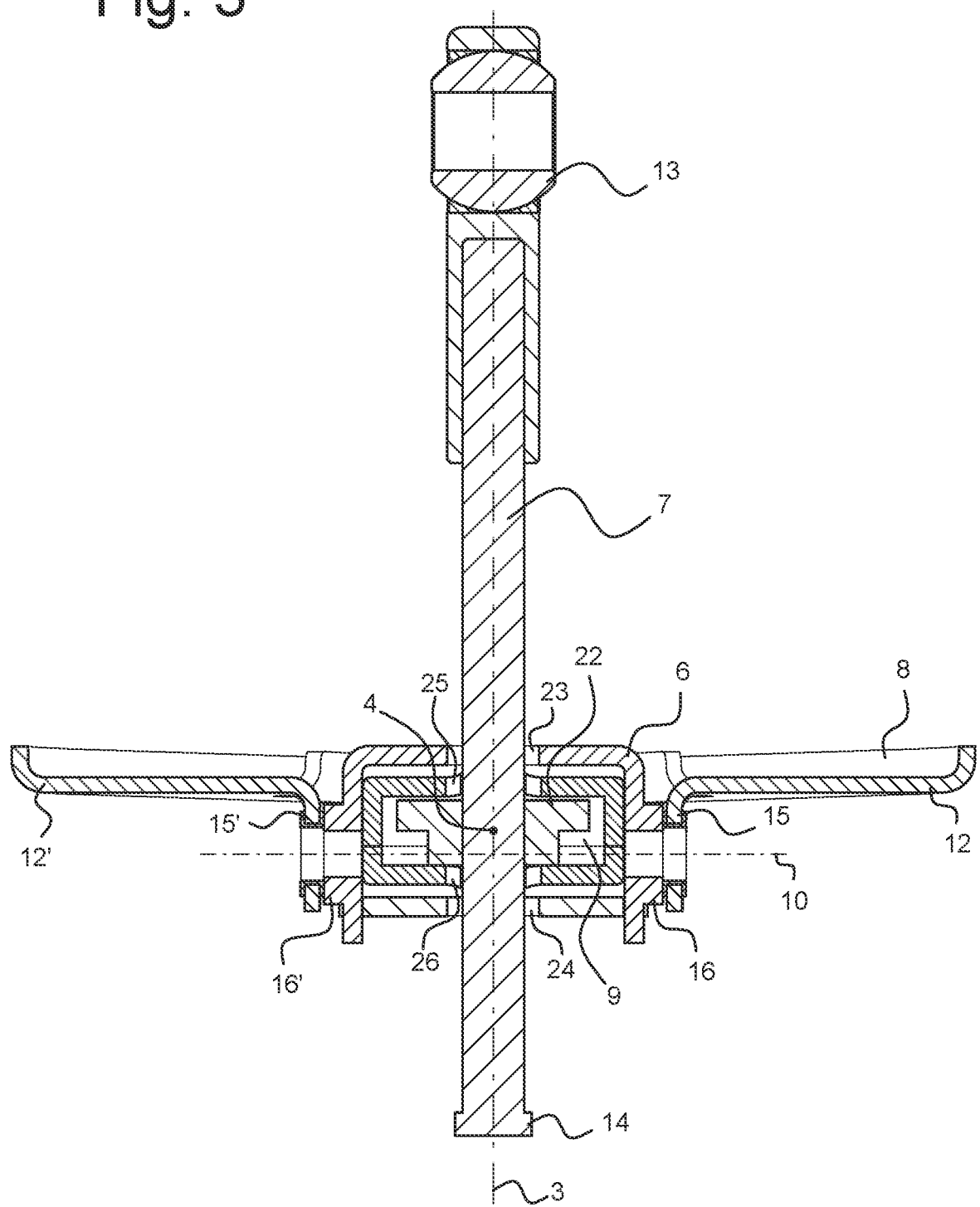
FIG. 3 shows a top cross-sectional view of the drive member of FIG. 1.

FIG. 3 shows the connection of the gear box 9 to the support member 6 and the pivoting connection of the stubs 16, 16' of the support member 6 to the flanges 15,15' of the fixation bracket 8. The gear box 9 includes rounded hinge members 25, 26, carrying the displacement rod 7, such that it can pivot about pivot axis 4. The displacement rod 7 passes through openings 23,24 in the support member 6 that leave sufficient space for the displacement rod 7 during pivoting about the pivot axis 4.

Figure 4:
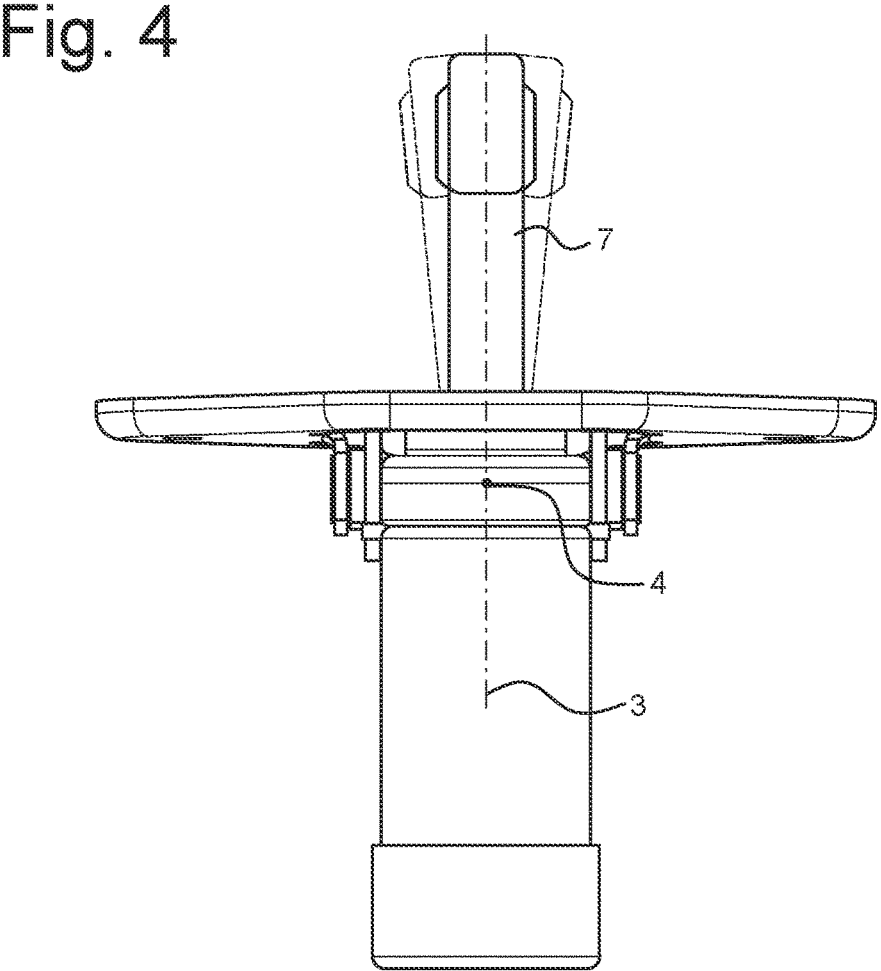
FIG. 4 shows a top view of the pivoting motion of the displacement rod about the pivot axis.

FIG. 4 shows the displacement rod in three different positions when pivoting about the pivot axis 4.

Figure 5:
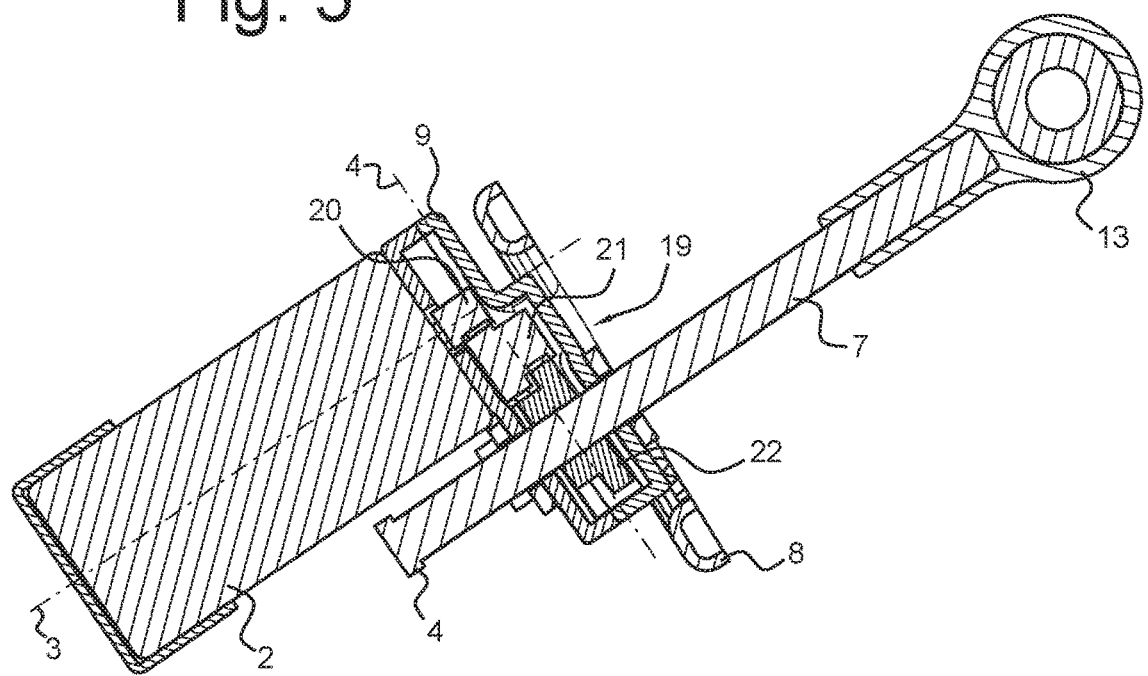
FIG. 5 shows a cross-sectional side of the gear mechanism of the drive member of FIG. 1.

FIG. 5 shows the gear mechanism 19 driving the displacement rod 7 in its length direction. A central gear 20 of the motor 2 drives a transmission gear 21 that interacts with the gear 22 that is positioned around the rod 7. The inside of the gear 22 is provided with teeth that interact with grooves on the rod so that rotation of the gear 22 moves the rod 7 in its length direction.

Figure 6:
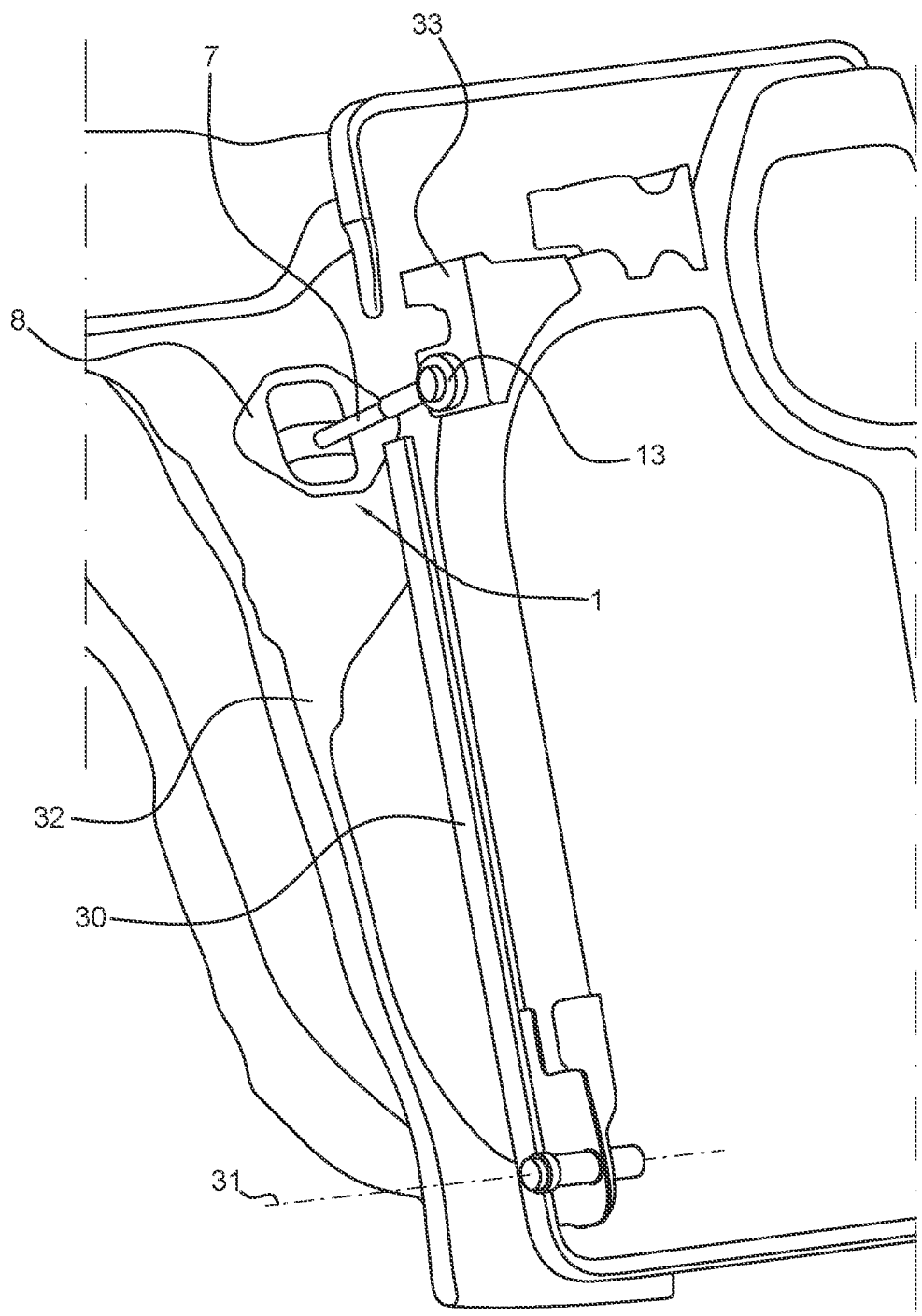
FIG. 6 shows the drive member according to the disclosure connected to a back rest of the rear seat of a motor vehicle.

FIG. 6 shows a back rest 30 of a rear seat, hingeable about a lower hinge axis 31. The fixation bracket 8 of the drive member 1 is connected to the frame 32 of the vehicle. The movable joint 13 of the drive member 1 is attached to an upper flange 33 of the backrest.

In this embodiment, the drive member 1 had been described for the adjustment of the back rest of a rear seat in a motor vehicle, but is not limited thereto. The drive member 1 according to the disclosure can be utilized for the adjustment of the relative positons of a wide range of interconnected objects.

The invention claimed is:

1. A drive member, comprising:
   a motor with a longitudinal axis and with at an actuating end a gear mechanism;
   a support member carrying a displacement rod that is movably mounted on the support member, the motor being with its actuating end connected to the support member;
   wherein the gear mechanism comprises a hinge member allowing pivoting of the displacement rod about a pivot axis that is oriented transversely to the longitudinal axis, the gear mechanism engaging with the displacement rod;
   wherein the support member is hingedly attached to a fixation bracket in a hinge connection that is hingeable about an axis which is transverse to the longitudinal axis and to the pivot axis;
   wherein the fixation bracket comprises a plate-shaped body with a central opening with at opposed edges of the opening a flange extending transversely to the plane of the body, the flanges carrying the support member.

2. The drive member according to claim 1, wherein the displacement rod extends along the motor in the direction of the longitudinal axis.

3. The drive member according to claim 1, the gear mechanism comprising a housing through which the displacement rod extends via rounded hinge members that are spaced apart in the direction of the longitudinal axis, the displacement rod passing through the support member via an opening that is larger than the displacement rod, such as to provide a pivot space.

4. The drive member according to claim 1, the motor being situated on a first side of the plate shaped body of the fixation bracket, the actuating rod extending through the opening to a second side of the plate-shaped body, and being provided at the second side with movable joint.

5. The drive member according to claim 2, the displacement rod at the side of the motor comprising a free end that is not provided with attachment means.

6. A vehicle, comprising:
   a seat with a back rest that can pivot about a lower pivot axis;
   a drive member, comprising:
     a motor with a longitudinal axis and with at an actuating end a gear mechanism;
     a support member carrying a displacement rod that is movably mounted on the support member, the motor being with its actuating end connected to the support member;
     wherein the gear mechanism comprises a hinge member allowing pivoting of the displacement rod about a pivot axis that is oriented transversely to the longitudinal axis, the gear mechanism engaging with the displacement rod;
     wherein the support member is hingedly attached to a fixation bracket in a hinge connection that is hingeable about an axis which is transverse to the longitudinal axis and to the pivot axis;
     wherein the fixation bracket comprises a plate-shaped body with a central opening with at opposed edges of the opening a flange extending transversely to the plane of the body, the flanges carrying the support member;
   wherein the fixation bracket is connected to a frame part of the vehicle and the displacement rod is attached to an upper part of the back rest.

7. The vehicle according to claim 6, wherein the seat is a rear seat.

8. The vehicle according to claim 6, wherein the displacement rod extends along the motor in the direction of the longitudinal axis.

9. The vehicle according to claim 6, the gear mechanism comprising a housing through which the displacement rod extends via rounded hinge members that are spaced apart in the direction of the longitudinal axis, the displacement rod passing through the support member via an opening that is larger than the displacement rod, such as to provide a pivot space.

10. The vehicle according to claim 6, the motor being situated on a first side of the plate shaped body of the fixation bracket, the actuating rod extending through the opening to a second side of the plate-shaped body, and being provided at the second side with movable joint.

11. The vehicle according to claim 8, the displacement rod at the side of the motor comprising a free end that is not provided with attachment means.

\* \* \* \* \*